(12) United States Patent
Soto et al.

(10) Patent No.: US 10,283,944 B2
(45) Date of Patent: *May 7, 2019

(54) SYSTEMS FOR MOTOR CONTROL CENTER BUCKETS

(71) Applicant: General Electric Company, Schenectady, NY (US)

(72) Inventors: Esmeralda Soto, Queretaro (MX); Edgar Ramirez, Queretaro (MX); Abigail Garza, Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,346

(22) Filed: Mar. 29, 2018

(65) Prior Publication Data

US 2018/0219360 A1    Aug. 2, 2018

Related U.S. Application Data

(63) Continuation of application No. 15/374,275, filed on Dec. 9, 2016, now Pat. No. 9,941,674.

(51) Int. Cl.
| | |
|---|---|
| *B60P 3/00* | (2006.01) |
| *E04H 5/02* | (2006.01) |
| *H02B 1/36* | (2006.01) |
| *F02C 9/00* | (2006.01) |
| *H02B 1/38* | (2006.01) |

(52) U.S. Cl.
CPC ............... *H02B 1/36* (2013.01); *B60P 3/00* (2013.01); *E04H 5/02* (2013.01); *F02C 9/00* (2013.01); *H02B 1/38* (2013.01); *F05D 2220/32* (2013.01); *F05D 2270/62* (2013.01)

(58) Field of Classification Search
None
See application file for complete search history.

(56) References Cited

U.S. PATENT DOCUMENTS

| | | | | |
|---|---|---|---|---|
| 4,024,441 A * | 5/1977 | Coyle | ............ | H02B 1/21 |
| | | | | 174/129 B |
| 4,090,230 A * | 5/1978 | Fuller | ............ | H02B 11/26 |
| | | | | 361/617 |
| 5,642,256 A * | 6/1997 | Pugh | ............ | H02B 11/133 |
| | | | | 200/50.02 |
| 6,031,192 A * | 2/2000 | Liebetruth | ............ | H02B 11/133 |
| | | | | 200/50.21 |

(Continued)

*Primary Examiner* — Xanthia C Cunningham
(74) *Attorney, Agent, or Firm* — Fletcher Yoder P.C.

(57) ABSTRACT

A control house includes a motor control center. The motor control center includes a body, and the body includes a face. The motor control center also includes a first orientation bucket that is configured to be disposed at least partially within the body at a first plurality of positions. The first position of the first plurality of positions extends a first distance from the face, and the first position of the first plurality of positions is configured to couple the first orientation bucket to first contacts. A second position of the first plurality of positions extends a second distance from the face that is greater than the first distance, and the second position of the first plurality of positions is configured to decouple the orientation bucket from the first contacts. Additionally, the second distance is less than or equal to 160 millimeters.

20 Claims, 3 Drawing Sheets

(56) References Cited

U.S. PATENT DOCUMENTS

| | | | | |
|---|---|---|---|---|
| 6,878,891 B1* | 4/2005 | Josten | .................. | H02B 13/025 |
| | | | | 200/293 |
| 7,337,450 B2* | 2/2008 | Sato | .................... | B60R 11/0211 |
| | | | | 720/647 |
| 7,965,493 B2* | 6/2011 | Leeman | .................... | H02B 1/36 |
| | | | | 200/50.17 |
| 8,553,394 B2* | 10/2013 | Hawkins | .............. | H02B 11/127 |
| | | | | 200/50.24 |
| 8,953,305 B2* | 2/2015 | Rodgers | .................. | H01H 3/06 |
| | | | | 200/50.24 |
| 9,299,522 B2* | 3/2016 | Sudhakar | ........... | H01H 71/0221 |
| 9,338,904 B2* | 5/2016 | Stoner | .................. | H05K 5/0208 |
| 9,531,169 B2* | 12/2016 | Oneufer | .................. | H02B 1/46 |
| 2007/0111575 A1* | 5/2007 | Jensen | ............... | H01R 13/6315 |
| | | | | 439/246 |
| 2008/0023211 A1* | 1/2008 | Yee | ......................... | H02B 1/36 |
| | | | | 174/50.52 |
| 2009/0301851 A1 | 12/2009 | Morris et al. | | |
| 2015/0103472 A1* | 4/2015 | Oneufer | ................. | H01H 71/56 |
| | | | | 361/605 |
| 2015/0255966 A1* | 9/2015 | Oneufer | .................. | H02B 1/48 |
| | | | | 361/631 |
| 2015/0380910 A1* | 12/2015 | Oneufer | .................. | H02B 1/46 |
| | | | | 361/622 |

* cited by examiner

SYSTEMS FOR MOTOR CONTROL CENTER BUCKETS

CROSS-REFERENCE TO RELATED APPLICATIONS

This application is a continuation of patent application Ser. No. 15/374,275, entitled "Systems for Motor Control Center Buckets," filed Dec. 9, 2016.

BACKGROUND OF THE INVENTION

The subject matter disclosed herein relates to the field of control houses, and more particularly to buckets of a motor control center in a control house.

Industrial systems, such as power plants and chemical process plants, include many subsystems that may be monitored and controlled. Monitor and control operations for one or more subsystems may be centralized. A control house may facilitate one or more operators to monitor and control the one or more subsystems. Various work stations, environmental control systems, subsystem control equipment, and monitoring equipment may be arranged within the control house. The one or more operators may move about within the control house to operate, test, or access elements within the control house. Some industrial systems may utilize a transportable control house. Unfortunately, the transport of the control house may limit the size and weight of the control house. Accessibility regulations may provide for minimum spacing between elements within the control house.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a control house includes a motor control center. The motor control center includes a body, and the body includes a face. The motor control center also includes a first orientation bucket that is configured to be disposed at least partially within the body at a first plurality of positions. The first position of the first plurality of positions extends a first distance from the face, and the first position of the first plurality of positions is configured to couple the first orientation bucket to first contacts. A second position of the first plurality of positions extends a second distance from the face that is greater than the first distance, and the second position of the first plurality of positions is configured to decouple the orientation bucket from the first contacts. Additionally, the second distance is less than or equal to 160 millimeters.

In a second embodiment, a control house includes a motor control center. The motor control center includes a body, and the body includes a face. An orientation bucket is configured to be disposed at least partially within the body at a plurality of positions. A first position of the plurality of positions extends a first distance from the face, and the first position of the plurality of positions is configured to couple the orientation bucket to main contacts and auxiliary contacts. A second position of the plurality of positions extends a second distance from the face greater than the first distance, and the second position of the plurality of positions is configured to decouple the orientation bucket from the main contacts and the auxiliary contacts. Also, the second distance is less than or equal to 160 millimeters, and the orientation bucket in the second position of the plurality of positions is offset at least 600 millimeters from a desk or an electrical enclosure that faces the orientation bucket.

In a third embodiment, a control house includes a motor control center. The motor control center includes a body, and the body includes a face. The motor control center also includes an orientation bucket. The first orientation bucket is configured to be disposed at least partially within the body at a plurality of positions. A first position extends a first distance from the face and is configured to couple the orientation bucket to main contacts and auxiliary contacts. A second position extends a second distance from the face that is greater than the first distance, and the second position is configured to decouple the orientation bucket from the main contacts and the auxiliary contacts. Additionally, the second distance is less than or equal to 160 millimeters. Moreover, a third position that extends a third distance from the face. The third position is configured to couple the orientation bucket to the auxiliary contacts and to decouple the orientation bucket from the main contacts, and the third distance is between the first distance and the second distance. Furthermore, the control house includes a trailer, the motor control center includes a cabinet door configured to open away from the face, and a range of motion of the cabinet door from the face is less than or equal to 400 millimeters.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
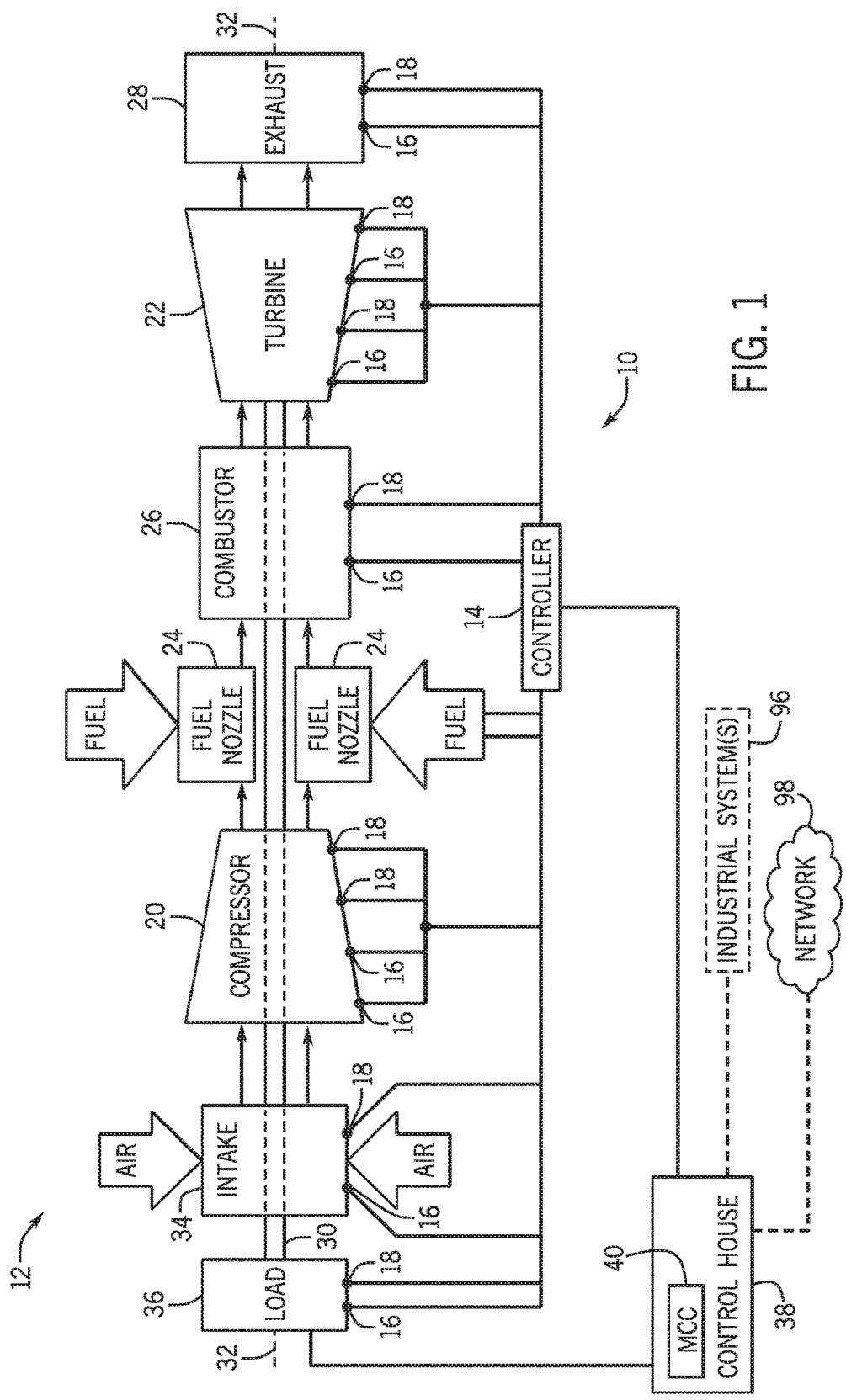
FIG. 1 is a block diagram of an embodiment of an industrial system, in accordance with the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Control houses may be used in various settings, such as industrial environments, to enable operators to monitor and control components of industrial systems. Present embodiments are directed to a system and method for the design and construction of one or more control houses and control house components. For example, some of the present embodiments may pertain to the organization, design, and structure of motor control centers within a control house that are configured to maximize the dimensions of a walkway within the control house. Moreover, construction of a control house that includes a motor control center with space-saving features may increase operator accessibility within the control house. Additionally, the space-saving features may allow operators to more easily enter and exit the industrial control house.

More specifically, present embodiments may reflect motor control centers with orientation buckets that have space-saving features. Motor control centers can be used to control motors or electrical devices that are associated with the motor control centers. Motor control centers typically include cabinet panel doors and orientation buckets (e.g., drawers), which provide access to the components of the motor control center. In present embodiments, orientation buckets may be configured such that they can be moved among a plurality of positions in order to allow an operator to control the functionality of the components within the orientation buckets. Accordingly, present embodiments allow operators to use, power on, test, disconnect, remove from power, and turn off the internal components of orientation buckets while the orientation buckets are still retained (e.g., positioned) within a motor control center. In other words, at least some of these tasks can be completed without first removing an orientation bucket from the motor control center. Additionally, cabinet panel doors of a motor control center may be positioned in a manner such that when the cabinet panel doors are ajar, a walkway of desirable size is provided between the motor control center and one or more other components of a control house.

Turning to the drawings, FIG. 1 is a block diagram of an embodiment of an industrial system 10 that includes a gas turbine system 12 and a controller 14. The controller 14 may be communicatively coupled to a variety of sensors 16 and actuators 18 disposed in various components of the gas turbine system 12. Signals received via the sensors 16 may be used to derive control actions executable via the actuators 18. The gas turbine system 12 may mix a fluid compressed via a compressor 20 with a liquid or gas fuel. For example, the fuel may be natural gas, diesel, or a hydrogen rich synthetic gas. The compressor 20 may include rotating blades and stationary vanes that may be disposed in rows or stages. The fluid (e.g., air, oxidant, exhaust gas) may be progressively compressed in stages or rows of rotating blades and corresponding static vanes as the fluid moves downstream in the compressor 20. For example, the compressor 20 may be a multi-stage axial compressor 20, having at least two rows of blades and vanes.

As depicted, a plurality of fuel nozzles 24 intakes a fuel supply, mixes the fuel with compressed air, and distributes the air-fuel mixture into a combustor 26. The air-fuel mixture combusts in a chamber within the combustor 26, thereby creating hot pressurized exhaust gases. The combustor 26 directs the exhaust gases through a turbine 22 toward an exhaust outlet 28. As the exhaust gases pass through the turbine 22, the gases force one or more turbine blades to rotate a shaft 30 along an axis 32 of the gas turbine system 12. As illustrated, the shaft 30 is connected to various components of the gas turbine system 12, including the compressor 20. The shaft 30 may also be connected to a load 36, which may be a vehicle or a stationary load, such as an electrical generator in a power plant or a propeller on an aircraft. The load 36 may include any suitable device configured to be powered by the rotational output of the gas turbine system 12. Additionally, the load 36 may be coupled in any manner (e.g., physically or communicatively) to a control house 38.

In some embodiments, the control house 38 may also be coupled to any one or more of the components of the industrial system 10 or the gas turbine system 12. Moreover, the control house 38 may be stationary or mobile. That is, the control house 38 may be in a fixed position (e.g., located on the ground) or transportable (e.g., positioned on a trailer, positioned within a shipping container). The control house 38 may include various electrical and mechanical components that may be utilized to control and monitor various components of the industrial system 10. Consequently, the control house 38 may monitor and control the load 36, the controller 14, a motor control center 40, starters, switchboard panels, batteries, battery chargers, meters, relays, and other parts of the industrial system 10.

As illustrated in FIG. 1, the control house 38 is coupled to the controller 14. As discussed above, the controller 14 may receive signals received via the sensors 16 that may be used to derive control actions executable via the actuators 18. The control house 38 may monitor the controller 14. That is, the control house 38 may be used monitor the controller 14, the signals the controller 14 receives via the sensors 16, and the control actions sent to the actuators 18 via the controller 14. The controller 14 may be disposed within the control house 38. In some embodiments, the controller 14 external from the control house 38 communicates via a wired or wireless connection with the components within the control house 38.

Furthermore, it should also be noted that the control house 38 may be communicatively coupled with more than one industrial system. For example, the control house 38 may be communicatively coupled to the industrial system 10 as well as one or more industrial systems 96. The one or more industrial systems 96 may include, but are not limited, to gas turbine systems, combined-cycle power generation systems, or other systems that may be controlled by the control house 38. Additionally, the control house 38 may be communicatively coupled to a network 98. The network 98 may be wireless. Moreover, the control house 38 may send and receive data to and from the network 98. The control house 38 may also be monitored and controlled via the network 98. For example, a control system that is also communicatively coupled to the network 98 may receive data from the control house 38 via the network 98. The control system may also send commands to be implemented by the control house 38 via the network 98.

As described in greater detail below, the control house 38 may include several space-saving features that increase the amount of space available for operators in the control house 38. A walkway is located between the motor control center 40 and either other components of the control house 38 or the control house 38 itself. The motor control center 40 may include orientation buckets and cabinet panel doors that may be opened and closed. Due to the space-saving features of the motor control center 40, there is sufficient space for operators to access and utilize the walkway even when the cabinet panel doors and the orientation buckets of the motor control center 40 are open.

Figure 2:
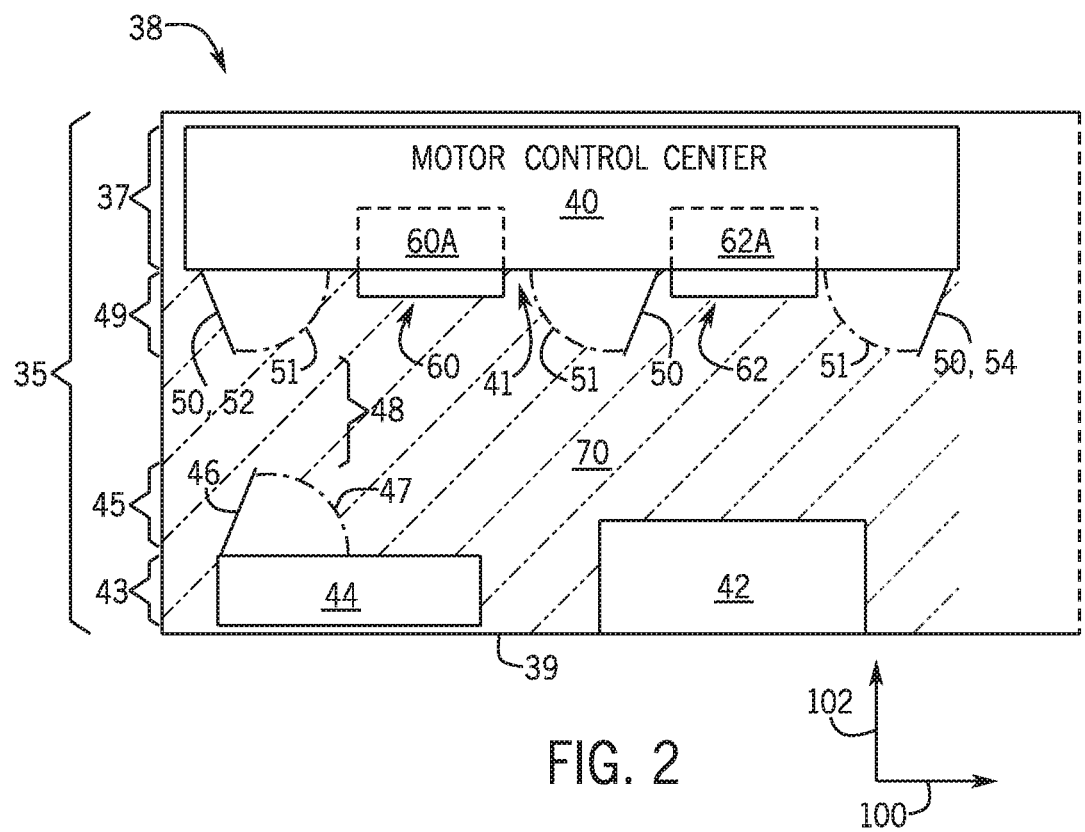
FIG. 2 is a schematic top plan view of a portion of an embodiment of the control house of the industrial system of FIG. 1, in accordance with the present disclosure.

With the foregoing in mind, FIG. 2 is a schematic top plan view of a portion of an embodiment of the control house 38 of the industrial system of FIG. 1. As used in the discussion of FIG. 2, the terms "wide" and "width" correspond to the width axis 102, and the term "length" corresponds to the axis 100. The control house 38 shown in FIG. 2 has a width of approximately 2200 to 2600 millimeters (approximately 86.61 to 102.36 inches). It may be appreciated that the width of the control house 38 may be selected to enable ready transportation of the control house 38 to the site of the industrial system 10. For example, a trailer with the control house 38 disposed thereon may be configured to be less than approximately 2600 mm (approximately 102.36 inches) so that the trailer may be comply with transportation regulations for highways to the industrial system 10. However, in other embodiments, the width of the control house 38 may differ.

In the illustrated embodiment, the control house 38 includes a motor control center 40, a desk 42, and an electrical enclosure 44. The motor control center 40 may be used to control motors or electrical devices associated with the motor control center 40. The desk 42 may be used by operators present in the control house. As discussed below, the electrical enclosure 44 may contain various control components utilized by the control house 38. As depicted in FIG. 2, the motor control center 40 faces both the desk 42 and the electrical enclosure 44. In some embodiments, the motor control center 40 faces only an interior wall 39 of the control house 38.

The motor control center 40 may include cabinet panel doors 50. FIG. 2 illustrates the cabinet panel doors 50 that are open. The cabinet panel doors 50 may open to any point that is within a range of motion 51 of the cabinet panel doors 50. For instance, in the embodiment illustrated in FIG. 2, the range of motion 51 of the cabinet panel doors 50 may be from 300 to 500 millimeters (11.81 to 23.62 inches) from a face 41 of the motor control center 40. The cabinet panel doors 50 may open to any point that is within this range of motion 51. The leftmost and rightmost cabinet panel doors 50 shown in FIG. 2 are cabinet panel doors 52 and 54, respectively. The motor control center 40 may also include sections 60, 62 (e.g., columns) of orientation buckets that are at least partially positioned within the motor control center 40. Orientation bucket 60a is arranged within section 60, and orientation bucket 62a is arranged within section 62. The orientation buckets 60a and 62a extend from the motor control center 40 along the width axis 102 of the control house 38. It should be noted that in other embodiments, the motor control center 40 may include any number of cabinet panel doors 50 (e.g., 0 to 10) and any number of columns or sections 60 and 62 of orientation buckets (e.g., 1 to 10). Additionally, the columns or sections 60 and 62 of orientation buckets may contain any number of orientation buckets 60a and 62a (e.g., 1 to 20). Moreover, as discussed in reference to FIG. 3 below, the motor control center 40 may include features or openings other than the cabinet panel doors 50 and orientation buckets.

Additionally, the cabinet panel doors 50 may be closed, and the orientation buckets 60a and 62a of the sections 60 and 62 of orientation buckets may be positioned such that they are disposed completely within the motor control center 40. Various electrical components such as, but not limited to, starters, transformers, fuses, wiring, and circuit breakers may be located within or behind the cabinet panel doors 50 and the orientation buckets 60a, 62a of the motor control center 40. The electrical components within the motor control center 40 may be communicatively coupled to components of the industrial system 10 or the other industrial systems 96 of FIG. 1. As discussed below, the orientation buckets 60a and 62a may be moved to certain positions or orientations. Each of the positions corresponds to a functionality of the orientation bucket 60a and 62a.

The electrical enclosure 44 may include various control components such as controllers (e.g., the controller 14 of FIG. 1), communication circuitry, power supplies, input/output modules, relays, signal splitters, terminal blocks, and circuit breakers. The control components may be used by the control house 38 to control the industrial system 10, to control other industrial systems 96, to communicate with the network 98, or any combination thereof. As illustrated in FIG. 2, the electrical enclosure 44 also includes a panel door 46. The panel door 46 of the electrical enclosure 44 may open along to any point along a panel door range of motion 47. The range of motion 47 of the panel door 46 may be approximately 400 to 600 millimeters (15.75 to 23.62 inches). It should be noted that in other embodiments, the electrical enclosure 44 may include two, three, four, or more panel doors 46, or the electrical enclosure 44 may not include any panel doors 46. Moreover, in some embodiments, the control house 38 may not include an electrical enclosure 44. However, in some embodiments, the control house 38 may include more than one electrical enclosure 44.

As shown in FIG. 2, motor control center 40 is positioned opposite to the electrical enclosure 44 and the desk 42 within the control house 38. In other embodiments, the motor control center 40, electrical enclosure 44, and desk 42 may be positioned in any way such that all three fit within the control house 38. A walkway 70 extends along the length (i.e., along the axis 100) of the control house 38. In the embodiment illustrated in FIG. 2, the walkway 70 is located between the motor control center 40 and both the electrical enclosure 44 and the desk 42. In some embodiments, the walkway 70 is located between the motor control center 40 and the interior wall 39 of the control house 38. The space-saving features of the control house 38 allow for the walkway 70 to have a desirable width. Additionally, the width of the walkway 70 may vary based on the opening of the one or more cabinet panel doors 50, the one or more panel doors 46, the orientation buckets 60a and 62a, or any other orientation buckets of the sections 60 and 62 of orientation buckets. However, the orientation buckets 60a and 62a, as well as all of the other orientation buckets of the sections 60 and 62, enable the walkway 70 to be maintained at a width greater than a threshold 48 (e.g., approximately 600 millimeters (approximately 23.62 inches)). As discussed herein, the orientation buckets 60a and 62a, the one or more cabinet panel doors 50, and the one or more panel doors 46 facilitate maintenance of the width of the walkway 70 to be greater than the threshold 48 regardless of the usage of the orientation buckets 60n and 60n, the cabinet panel doors 50, and the panel door 46 of the control house 38.

With the foregoing in mind, some of the dimensions of the embodiment of the control house 38 illustrated in FIG. 2 and the components that may be included inside of the control house 38 will be discussed. As discussed above, the control house 38 may have a width 35 of 2200 to 2600 millimeters (86.61 to 102.36 inches). The motor control center 40 may have a width 37 of approximately 500 to 700 millimeters (19.68 to 27.55 inches), and the cabinet panel doors 50 may have a cabinet panel door width 49 of approximately 300 to 500 millimeters (11.81 to 23.62 inches). The orientation buckets 60a, 62a may extend up to approximately 60, 80, 100, 120, 140, or 160 millimeters or more from the motor control center 40. For example, the orientation buckets 60a, 62a may extend 120 millimeters or less from the motor control center 40. The electrical enclosure 44 may have a width 43 of approximately 200 to 400 millimeters (8.87 to 15.75 inches), the panel door 46 of the electrical enclosure 44 may have a panel door width 45 of approximately 400 to 600 millimeters (15.75 to 23.62 inches), and the desk 42 may have a width of approximately 400 to 500 millimeters (15.75 to 19.69 inches). It is to be appreciated that the components of the control house 38 are to be arranged such that when the cabinet panel doors 50 of the motor control center 40, the orientation buckets 60a, 62a, and the panel door 46 of the electrical enclosure 44 are ajar, the narrowest width of the walkway 70 between the motor control center 40 and the electrical enclosure 44 is at least 600 millimeters wide. For example, in some embodiments in which the width 35 of the control house 38 may be 2439.7 millimeters (96.05 inches), the width 37 of the motor control center 40 may be 600 millimeters (23.62 inches), the cabinet panel door width 49 may be 400 millimeters (15.75 inches), and the panel door width 45 may be 500 millimeters (19.69 inches), the walkway 70 has a minimum width of 639.7 millimeters (25.19 inches). As discussed herein, the term approximately may be understood to include values within 10 percent of the stated value.

Additionally, in embodiments in which the width 35 of the control house 38 may be 2439.7 millimeters (96.05 inches), the width 37 of the motor control center 40 may be 600 millimeters (23.62 inches), the cabinet panel door width 49 may be 400 millimeters (15.75 inches), and the panel door width 45 may be 500 millimeters (19.69 inches), the walkway 70 has a minimum width of 982.5 (38.36 inches) millimeters between the motor control center 40 and the desk 42. As discussed below, in other embodiments, the width of the walkway 70 may be greater than 639.7 (25.19 inches) millimeters or 982. 5 millimeters (38.36 inches). Moreover, in any case, the walkway 70 is at least 600 millimeters (23.62) wide.

Figure 3:
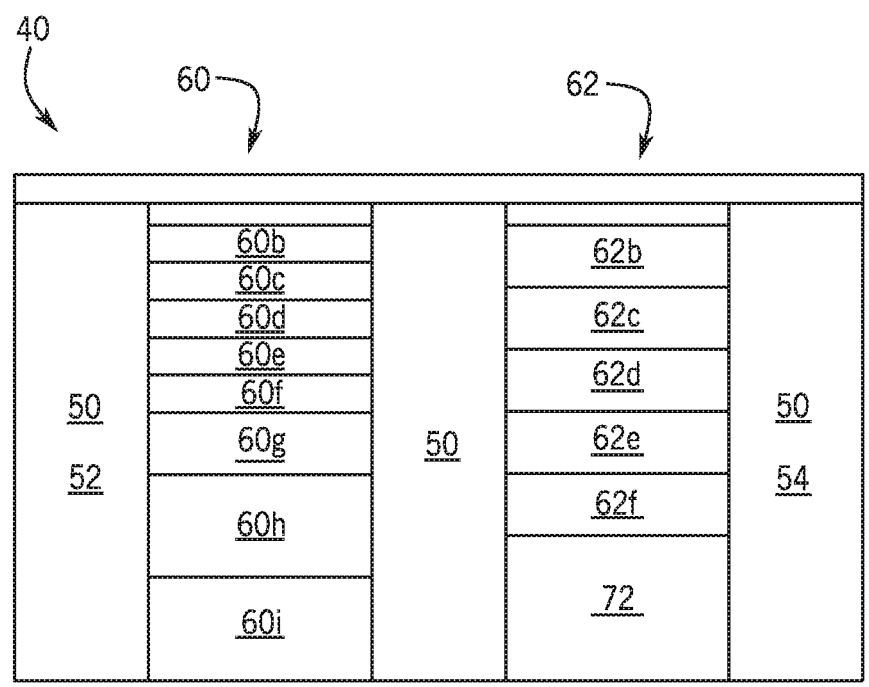
FIG. 3 is a schematic front view of an embodiment of the motor control center of the control house of FIG. 2, in accordance with the present disclosure.

The motor control center 40 will now be discussed in greater detail. FIG. 3 is a schematic front view of the motor control center 40 of FIG. 2. The motor control center 40 may include more exterior components than the cabinet panel doors 50 or the sections 60 and 62 of orientation buckets. For example, the embodiment of the motor control center 40 illustrated in FIG. 3 also includes a removable cover 72 which, if removed, may allow an operator to access components of the motor control center 40 that are located behind the removable cover 72 (i.e., located inside of the of the motor control center 40). Additionally, orientation buckets 60b-60i and 62b-62f of the sections 60 and 62 may vary in height, width, and depth. In some embodiments, the orientation, number, and size of the orientation buckets 60b-60i, 62b-62f, and the cabinet panel doors 50 may differ from those of the present embodiment. For example, in another embodiment, there may be three columns of orientation buckets and two cabinet panel doors 50. As a further example, the column 60 of orientation buckets and the leftmost cabinet panel door 52 may be respectively located in the motor control center 40 where the cabinet panel door 52 and the column 60 of orientation buckets are located in FIG. 2. In other words, the location of the leftmost cabinet panel door 52 and the column 60 of orientation buckets may be switched. It should be noted that the internal components of the motor control center 40 may be arranged differently in accordance with the alternative embodiments. For example, in an embodiment where the locations of the leftmost cabinet panel door 52 and the column 60 of orientation buckets have been switched, the internal components of the motor control center 40 may be located within the motor control center 40 in a different manner due to the switching of the positions of the leftmost cabinet panel door 52 and the column 60 of orientation buckets.

Moreover, in other embodiments, the orientation, number, size, or type of the cabinet panel doors 50 and the orientation buckets 60b-60i, 62b-62f could be altered so as to create a walkway 70 that is wider than the threshold 48 discussed above. For example, in another embodiment, each of the cabinet panel doors 50 can be replaced with two cabinet panel doors that are approximately half the width of the cabinet panel doors 50 of the embodiment as shown in FIG. 2. In other words, in such an embodiment, the cabinet panel doors 50 are approximately 150 to 250 millimeters (5.91 to 9.84 inches) wide, and the walkway 70 is at least 839.7 (33.06 inches) millimeters wide. Additionally, or in the alternative, the cabinet panel doors 50 may be replaced with double-hinged or folding cabinet panel doors.

In yet another embodiment, the orientation of cabinet panel doors 50 and orientation buckets 60b-60i may be configured such that only orientation buckets 60b-60i are positioned directly across from the electrical enclosure 44. In other words, in contrast to the embodiment depicted in FIG. 2, no cabinet panel doors 50 are positioned directly across from the electrical enclosure 44. In such an embodiment, if the width 35 of the control house 38 is 2439.7 millimeters (96.05 inches), the width 37 of the motor control center 40 is 600 millimeters (23.62 inches), the cabinet panel door width 49 is 400 millimeters (15.75 inches), and the panel door width 45 is 500 millimeters (19.69 inches), the minimum width of the walkway 70 is at least 1039.7 millimeters (40.93 inches).

In still another embodiment, the control house 38 may not include the electrical enclosure 44, the desk 42, or both the electrical enclosure 44 and the desk 42. For example, the minimum width of the walkway 70 may be at least 982.5 millimeters (38.68 inches) wide between only the motor control center 40 and the desk 42, where the desk width is 457.2 millimeters (18.0 inches), the width 35 of the control house 38 is 2439.7 millimeters (96.05 inches), the width 37 of the motor control center 40 is 600 millimeters (23.62 inches), the cabinet panel door width 49 is 400 millimeters (15.75 inches), and the panel door width 45 is 500 millimeters (19.69 inches). Additionally, the minimum width of the walkway 70 may be at least 639.7 millimeters (25.19 inches) wide between only the motor control center 40 and the electrical enclosure 44, where the width 43 of the electrical enclosure 44 is 300 millimeters (11.81 inches), the width 35 of the control house 38 is 2439.7 millimeters (96.05 inches), the width 37 of the motor control center 40 is 600 millimeters (23.62 inches), the cabinet panel door width 49 is 400 millimeters (15.75 inches), and the panel door width 45 is 500 millimeters (19.69 inches). However, if the control house 38 does not include the electrical enclosure 44 or the desk 42, the minimum width of the walkway 70 is at least 1439.7 millimeters (56.68 inches) between the motor control center 40 and the interior wall 39 of the control house 38.

It should be noted that some of the embodiments discussed above may be combined with one another to form other embodiments. For example, in one embodiment, in which the width 35 of the control house 38 is 2439.7 millimeters (96.05 inches), the width 37 of the motor control center 40 is 600 millimeters (23.62 inches), the cabinet panel door width 49 is 400 millimeters (15.75 inches), and the panel door width 45 is 500 millimeters (19.69 inches), each of the cabinet panel doors 50 may be replaced with two doors that are each approximately 200 millimeters (approximately 7.87 inches) wide, and the control house 38 may not include the electrical enclosure 44 or the desk 42. In such an embodiment, the minimum width of the walkway 70 is at least 1639.7 millimeters (64.56 inches) wide between the motor control center 40 and the interior wall 39.

Additionally, while specific ranges of dimensions have been used to discuss various embodiments of the motor control center 40 and the control house 38, it should be noted that other embodiments may have different dimensions. However, in such embodiments, the space-saving features of the control house allow the walkway 70 to maintain a width of at least 600 millimeters (23.62 inches). Moreover, the space-saving features may enable the control house 38 to be smaller, lighter, or include more components that those shown in FIG. 2, yet still allow the walkway 70 to maintain a width of at least 600 millimeters (23.62 inches).

Figure 4:
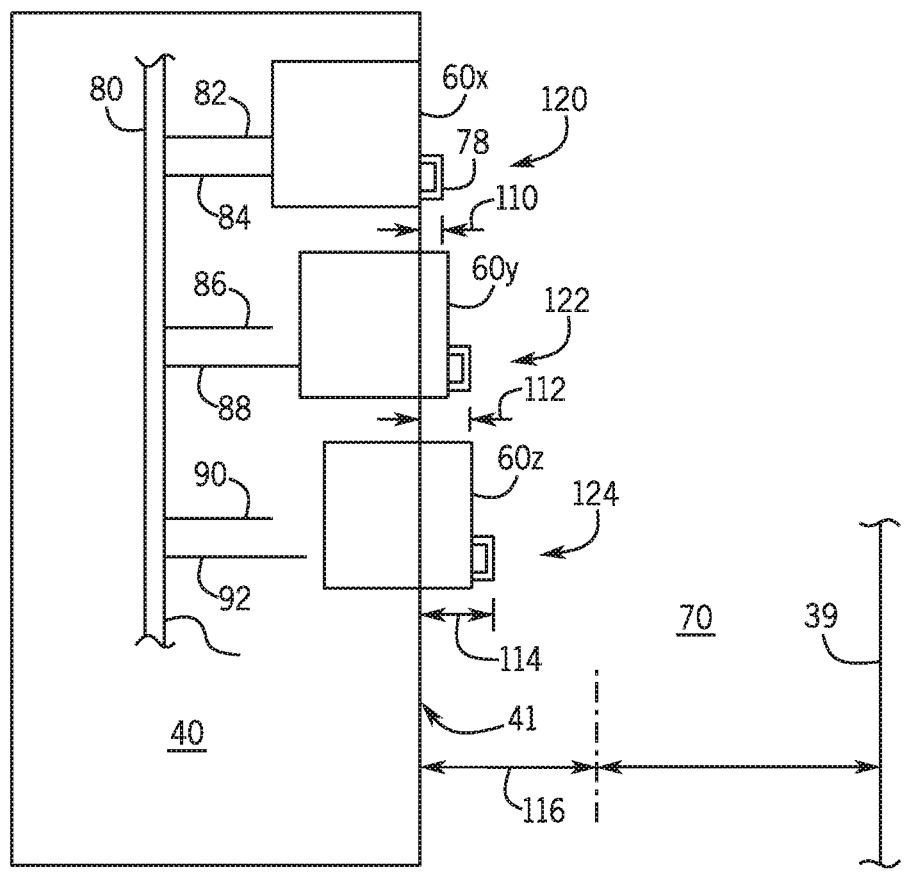
FIG. 4 is a cross sectional side view of one embodiment of the motor control center of FIG. 3, in accordance with the present disclosure.

With other space-saving features of the motor control center 40 in mind, FIG. 4 is a side view of a cross section of an embodiment of a motor control center 40. As illustrated, there are three orientation buckets 60x, 60y, and 60z that are each set in different positions: a first orientation bucket 60x, a second orientation bucket 60y, and a third orientation bucket 60z. Each of these three positions corresponds to a different functionality of the respective orientation bucket 60x, 60y, and 60z.

Each of the functionalities provided by each of the positions of the orientation buckets 60x, 60y, and 60z may achieved by making or breaking connections with various electrical components of the motor control center 40. For example, connections with main contacts 82, 86, and 90 as well as auxiliary contacts 84, 88, and 92 may be made or broken. As discussed above, the motor control center 40 may be used to control motors or electrical devices associated with the motor control center 40. Changing the position of the orientation buckets 60x, 60y, and 60z may change the functionality of the motors or electrical devices associated with the orientation buckets 60x, 60y, and 60z. For instance, the orientation bucket 60x may be associated with motors that are included in the turbine 22. Changing the position of the orientation bucket 60x may affect whether the motors of the turbine 22 are operating. The main contacts 82, 86, and 90 may be incoming or outgoing, or there may be both incoming and outgoing main contacts with any of the orientation buckets 60x, 60y, and 60z. The main contacts 82, 86, and 90 may, via a busbar 80, provide the main source of electricity that can be used to power the internal components of the orientation buckets 60x, 60y, and 60z. The busbar 80 provides electricity to the main contacts 82, 86, and 90 as well as the auxiliary contacts 84, 88, and 92. In other embodiments, there may be multiple busbars. For instance, the busbar 80 may provide electricity to the main contacts 82, 86, and 90 and a second busbar may provide power to the auxiliary contacts 84, 88, and 92. In some embodiments, a first busbar may provide electricity to the main and auxiliary contacts 82, 84 of the first orientation bucket 60x, a second busbar may provide electricity to the main and auxiliary contacts 86, 88 of the second orientation bucket 60y, and a third busbar may provide electricity to the main and auxiliary contacts 90, 92 of the third orientation bucket 60z.

When any of the main contacts 82, 86, and 90 are not connected to or in contact with the orientation buckets 60x, 60y, and 60z, respectively, the internal components of the corresponding orientation bucket will not be able to be powered from their main source of electricity. On the other hand, the auxiliary contacts 84, 88, and 92 may also be used to provide power to electrical components of the orientation buckets 60x, 60y, and 60z. It should be noted that the auxiliary contacts 84, 88, and 92 may provide power to some or all of the same electrical components of the orientation buckets 60x, 60y, and 60z as the main contacts 82, 86, and 90. As discussed below, when the orientation buckets 60x, 60y, and 60z are in a connected position 120, the main contacts 82, 86, and 90 and the auxiliary contacts 84, 88, and 92 may be in contact with the corresponding orientation bucket 60x, 60y, and 60z. However, when at a disconnected position 124, one of the orientation buckets 60x, 60y, and 60z may not interface with either the main contacts 82, 86, and 90 or the auxiliary contacts 84, 88, and 92. Additionally, when the orientation buckets 60x, 60y, and 60z are at an intermediate (e.g., test) position 122, the orientation buckets 60x, 60y, and 60z may only interface with the auxiliary contacts 84, 88, and 92.

The first orientation bucket 60x, which is disposed completely within the motor control center 40 except for certain exterior features such as a handle 78, is set in the connected position 120. As illustrated in FIG. 4, while in the connected position 120, the first orientation bucket 60x may be in contact with both the main contact 82 and the auxiliary contact 84, thereby providing electricity via both the main contact 82 and the auxiliary contact 86 to the electrical components of the first orientation bucket 60x. Thus, while in the connected position 120, the electronic components located within the first orientation bucket 60x may be fully functional. In other words, while the first orientation bucket 60x is in the connected position 120, the one or more motors connected to or associated with the equipment located within the first orientation bucket 60x may be controlled. Additionally, while in the connected position 120, the orientation bucket 60x may extend a first distance 110 from the motor control center. The first distance may be the distance by which the handle 78 extends from the motor control center 40 and the orientation bucket 60x. In other words, the first distance 110 is the distance that the orientation bucket 60x extends into the walkway 70. In some embodiments, the handle 78 is recessed within the orientation bucket 60x such that the handle 78 does not extend from the face 41 of the motor control center 40. The first distance may be 0 to 70 millimeters (0 to 2.76 inches).

The second orientation bucket 60y, which is partially disposed outside of the motor control center 40, is set in the test position 122. As illustrated in FIG. 4, while in the test position 122, the main contact 86 is not connected to the second orientation bucket 60y, but the auxiliary contact 88 is connected to the second orientation bucket 60y. Thus, power is provided to the components that may receive power via the auxiliary contact 88. As such, those components may be tested to verify that they are functioning properly. That is, if in the test position 122, some of the components disposed within the second orientation bucket 60y may be completely or partially functional while others may not be functional. Moreover, while in the test position 122, the second orientation bucket 60y extends a second distance 112 from the motor control center 40. In other words, the second distance 112 is the distance that the second orientation bucket 60y extends into the walkway 70 and towards the interior wall 39. The second distance 112 is greater than the first distance 110 but less than a third distance 114 associated with when an orientation bucket 60x, 60y, and 60z is at a disconnected position 124. The second distance may be 20 to 90 millimeters (0.79 to 3.54 inches).

The third orientation bucket 60z, which is disposed such that it extends from the motor control center 40 by 120 millimeters (4.72 inches), is set in the disconnected position 124. As illustrated in FIG. 4, while in the disconnected position 124, neither the main contact 90 nor the auxiliary contact 92 is coupled to the third orientation bucket 60z. Thus, no power is provided to the components of the third orientation bucket 60z, and as such, the components located within the third orientation bucket 60z are not functional. In other words, all power to the third orientation bucket 60z may be severed without removing the third orientation bucket 60z from the motor control center 40. It is to be appreciated that while the third orientation bucket 60z is in the disconnected position 124, an operator may service or inspect the orientation bucket 60z and service or inspect the components located within the orientation bucket 60z. That is, the disconnected position 124 enables an operator to inspect or service the third orientation bucket 60z and the components located within the orientation bucket 60z without total removal of orientation bucket 60z from the motor control center 40. Additionally, while in the disconnected position 124, the third orientation bucket 60z may extend the third distance 114 from the motor control center 40. That is, the third distance 114 is the distance that the third orientation bucket 60z extends into the walkway 70. The third distance 114 may be 60 to 160 millimeters (2.36 to 6.30 inches), and the third distance is greater than both the first distance 110 and the second distance 112. In some embodiments, the third distance 114 is 120 millimeters (4.72 inches) or less.

Keeping the foregoing in mind, it should be noted that any of the orientation buckets 60x, 60y, and 60z may be completely removed from the motor control center 40. That is, the orientation buckets 60x, 60y, and 60z may be moved to a removable position at which the orientation buckets 60x, 60y, and 60z can be taken out of the motor control center 40. At the removable position, the orientation buckets 60x, 60y, and 60z may extend a fourth distance 116 from the motor control center. The fourth distance 116 is larger than the first distance 110, the second distance 112, and the third distance 114. In any case, it should be noted that the functionalities of the orientation buckets 60x, 60y, and 60z are achieved while the orientation buckets 60x, 60y, and 60z are in the connected, test, and disconnected positions 120, 122, and 124. In other words, the internal components of the orientation buckets 60x, 60y, and 60z may go from fully functional to partially functional to fully nonfunctional by moving the orientation buckets 60x, 60y, and 60z from the connected position 120 to the test position 122 and to the disconnected position 124, respectively. While in any of the connected, test, and disconnected positions 120, 122, and 124, the orientation buckets 60x, 60y, and 60z may extend from the motor control center 40 by no more than the third distance 114. That is, all functionalities associated with the motor control center may be achieved by moving the orientation buckets 60x, 60y, and 60z a distance away from the face 41 of motor control center 40 that is no greater than the third distance 114, thereby enabling maintenance of the width of the walkway 70 to be greater than the threshold 48. While any of the orientation buckets 60x, 60y, and 60z is in the disconnected position (i.e., extends the third distance 114 from the motor control center 40), the walkway 70 is at least the threshold 48 width (e.g., 600 millimeters (23.62 inches)).

Each of the orientation buckets 60x, 60y, and 60z may be moved to any of the positions discussed above. In other words, the orientation buckets 60x, 60y, and 60z may each be moved to the connected position 120, the test position 122, and the disconnected position 124. Furthermore, while the present embodiment may use the busbar 80, the main contacts 82, 86, 90, and the auxiliary contacts 84, 88, and 92 to achieve the functionalities associated with each of the connected, test, and disconnected positions 120, 122, and 124, it is to be appreciated by those in the art that other means could be used. For example, one could use springs and a biased connection, magnets, and electromagnets. Additionally, a component that extends or protrudes from the orientation buckets 60x, 60y, and 60z, such as a brush, may also be used. For instance, a brush that interfaces a contact when the orientation buckets 60x, 60y, and 60z are at some or all of the connected position 120, test position 122, and disconnected position 124 may be utilized instead of or in conjunction with cables.

Moreover, while the orientation buckets 60x, 60y, and 60z are in the connected, test, and disconnected positions 120, 122, and 124, the orientation buckets 60x, 60y, and 60z may also be mechanically connected to the motor control center 40. For example, the orientation buckets 60x, 60y, and 60z may include exterior grooves or indentations that align with internal indentations or grooves of the motor control center 40, respectively. When the orientation buckets 60x, 60y, and 60z are moved from one position to another the grooves and indentations may be aligned. Additionally, it should be noted that the orientation buckets 60x, 60y, and 60z may each be at any of the connected, test, and disconnected positions 120, 122, and 124. In other words, the orientation buckets 60x, 60y, and 60z may be positioned at any of the connected, test, and disconnected positions 120, 122, and 124 independently of one another. That is, the position of one of the orientation buckets 60x, 60y, and 60z does not depend on the position of another of the orientation buckets 60x, 60y, and 60z. Furthermore, the orientation buckets 60x, 60y, and 60z may be modular such that one or more of the orientation buckets 60x, 60y, and 60z may be switched with one or more of the other orientation buckets 60x, 60y, and 60z. For example, the orientation buckets 60x and 60y may be removed from the motor control center 40, and the orientation bucket 60y may be placed within the motor control center 40 where the orientation bucket 60x is located in FIG. 4; the orientation bucket 60x may be placed within the motor control center 40 where the orientation bucket 60y is located in FIG. 4.

Technical effects of the presently disclosed systems and techniques include the placement and space-saving features of components within the control house 38 that allow the walkway 70 located between the motor control center 40 and a boundary of the control house 38 to have desirable width. In other words, placement and space-saving features of components within the control house 38 allow maintenance of the walkway 70 with a width that is at least as wide as the threshold 48. Moreover, the orientation buckets 60x, 60y, and 60z of the motor control center 40 may be moved to various positions, including the disconnected position 124 at which the orientation buckets 60x, 60y, and 60z extend from the motor control center 40 by up to 160 millimeters (6.30 inches). In some embodiments, the disconnected position 124 of the orientation buckets 60x, 60y, and 60z may extend 120 millimeters (4.72 inches) or less from the motor control center 40. Thus, an operator may inspect or perform maintenance on the components within an orientation bucket 60x, 60y, and 60z while maintaining a desired width of the walkway 70. Due in part to the disconnected position 124 only extending 60 to 160 millimeters (2.36 to 6.30 inches) from the motor control center 40, the walkway 70 may maintain a width at least as large as the threshold 48 regardless of the position of the orientation buckets 60x, 60y, and 60z.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a motor control center, wherein the motor control center comprises:
      a body comprising a face; and
      an orientation bucket configured to be disposed at least partially within the body at a plurality of positions, wherein a first position of the plurality of positions extends a first distance from the face, a second position of the plurality of positions extends a second distance from the face greater than the first distance, and the second position of the plurality of positions is configured to decouple the orientation bucket from contacts.

2. The system of claim 1, wherein the contacts comprise one or more main contacts and one or more auxiliary contacts.

3. The system of claim 2, wherein a third position of the plurality of positions extends a third distance from the face, the third position of the plurality of positions is configured to couple the orientation bucket to the one or more auxiliary contacts and to decouple the orientation bucket from the one or more main contacts, and the third distance is between the first distance and the second distance.

4. The system of claim 3, wherein the third distance is less than or equal to 90 millimeters.

5. The system of claim 1, wherein the orientation bucket in the second position of the plurality of positions is offset at least 600 millimeters from an interior wall, desk, or electrical enclosure of the system that faces the orientation bucket.

6. The system of claim 5, wherein the system comprises the desk or the electrical enclosure, the desk or the electrical enclosure comprises a movable element that extends towards the orientation bucket, and the orientation bucket in the second position of the plurality of positions is offset at least 600 millimeters from the movable element.

7. The system of claim 6, wherein the movable element comprises a door.

8. The system of claim 1, wherein the second distance is less than or equal to 160 millimeters.

9. The system of claim 1, wherein the system comprises a trailer.

10. The system of claim 1, wherein the orientation bucket comprises a starter.

11. The system of claim 1, wherein a fourth position of the plurality of positions extends a fourth distance from the face greater than the second distance, and the fourth position of the plurality of positions is configured to decouple the orientation bucket from the contacts and to decouple the orientation bucket from the motor control center.

12. The system of claim 1, wherein the body comprises a rear surface, and the face is at least 200 millimeters from the rear surface.

13. The system of claim 1, wherein the motor control center comprises a cabinet door configured to open away from the face, wherein a range of motion of the cabinet door from the face is less than or equal to 400 millimeters.

14. A control house comprising:
   a motor control center, wherein the motor control center comprises:
      a body comprising a face; and
      an orientation bucket configured to be disposed at least partially within the body at a plurality of positions, wherein a first position of the plurality of positions extends a first distance from the face, the first position of the plurality of positions is configured to couple the orientation bucket to one or more main contacts and one or more auxiliary contacts, a second position of the plurality of positions extends a second distance from the face greater than the first distance, the second position of the plurality of positions is configured to decouple the orientation bucket from the one or more main contacts and the one or more auxiliary contacts, and the orientation bucket in the second position of the plurality of positions is offset at least 600 millimeters from a wall, a desk, or an electrical enclosure that faces the orientation bucket.

15. The control house of claim 14, wherein a third position of the plurality of positions extends a third distance from the face, the third position of the plurality of positions is configured to couple the orientation bucket to the one or more auxiliary contacts and to decouple the orientation bucket from the one or more main contacts, and the third distance is between the first distance and the second distance.

16. The control house of claim 14, wherein the control house comprises the desk or the electrical enclosure, the desk or the electrical enclosure comprises a door that extends towards the orientation bucket, and the orientation bucket in the second position of the plurality of positions is offset at least 600 millimeters from the door.

17. The control house of claim 14, wherein the control house comprises a trailer.

18. A motor control center comprising:
   a body comprising a face; and
   an orientation bucket configured to be disposed at least partially within the body at a plurality of positions comprising a disconnected position that extends a first distance from the face that is less than or equal to 160 millimeters, wherein the disconnected position is configured to decouple the orientation bucket from one or more main contacts and one or more auxiliary contacts.

19. The motor control center of claim 18, wherein the plurality of positions comprises a partially connected position that extends a second distance from the face that is less than the first distance, wherein the partially connected position is configured to couple the orientation bucket to the one or more auxiliary contacts and to decouple the orientation bucket from the one or more main contacts.

20. The motor control center of claim 18, comprising a second orientation bucket configured to be disposed at least partially within the motor control center and above or below the orientation bucket.

* * * * *